United States Patent
Wu et al.

(10) Patent No.: US 10,294,971 B2
(45) Date of Patent: May 21, 2019

(54) FIXING DEVICE

(71) Applicant: HANWIT PRECISION INDUSTRIES LTD., New Taipei (TW)

(72) Inventors: Ming-De Wu, New Taipei (TW); Chih-Yuan Chen, New Taipei (TW)

(73) Assignee: HANWIT PRECISION INDUSTRIES LTD., New Taipei (TW)

( * ) Notice: Subject to any disclaimer, the term of this patent is extended or adjusted under 35 U.S.C. 154(b) by 136 days.

(21) Appl. No.: 15/264,930

(22) Filed: Sep. 14, 2016

(65) Prior Publication Data

US 2018/0073534 A1 Mar. 15, 2018

(51) Int. Cl.
*F16B 5/06* (2006.01)
*F16B 5/02* (2006.01)

(52) U.S. Cl.
CPC .......... *F16B 5/0635* (2013.01); *F16B 5/0642* (2013.01); *F16B 5/0208* (2013.01); *F16B 2005/0671* (2013.01)

(58) Field of Classification Search
CPC .............................. F16B 5/0635; F16B 5/0642
See application file for complete search history.

(56) References Cited

U.S. PATENT DOCUMENTS

| | | | | |
|---|---|---|---|---|
| 2,053,864 A * | 9/1936 | Cook | ...................... | E05D 11/02 16/274 |
| 5,507,610 A * | 4/1996 | Benedetti | .............. | F16B 5/0628 24/297 |
| 5,577,295 A * | 11/1996 | Papke | ...................... | E05D 5/128 16/254 |
| 6,178,599 B1 * | 1/2001 | Worden | .................. | B62D 65/06 16/261 |
| 7,954,205 B2 * | 6/2011 | Xueyong | ............. | B60R 13/0206 24/289 |
| 8,495,802 B2 * | 7/2013 | Okada | .................. | B60R 13/0206 24/297 |
| 8,555,466 B1 * | 10/2013 | Wang | ........................ | B25G 3/18 16/422 |
| 2004/0016088 A1 * | 1/2004 | Angellotti | ............... | F16B 5/065 24/297 |
| 2011/0070046 A1 * | 3/2011 | Wang | .................... | F16B 5/0208 411/120 |
| 2011/0070049 A1 * | 3/2011 | Wang | .................... | F16B 5/0208 411/372.6 |

(Continued)

*Primary Examiner* — Jason W San
(74) *Attorney, Agent, or Firm* — Muncy, Geissler, Olds & Lowe, P.C.

(57) ABSTRACT

The present disclosure illustrates a fixing device comprising a sleeve which has a through hole inside and has grooves recessed on an outer surface thereof, and is placed inside receiving space of an outer casting tube, and the receiving space being formed with longitudinal protrusion rib disposed on an inside wall thereof and slidable in the grooves, and a head part is disposed inside the receiving space and has a mounting; a resilient component is abutted between the head part and the sleeve; a fastener fixed on the head part and having a riveting part mounted in the mounting hole, and a rod extended from a bottom thereof and inserted through the through hole, and having longitudinal sections and arc surfaces and the rod having a stop part outwardly protruded on a bottom side thereof, and having a guiding incline formed at top thereof.

10 Claims, 10 Drawing Sheets

(56) References Cited

U.S. PATENT DOCUMENTS

| | | | |
|---|---|---|---|
| 2011/0081218 A1* | 4/2011 | Wang | F16B 5/0208 411/120 |
| 2011/0123291 A1* | 5/2011 | Chiu | F16B 5/0208 411/342 |
| 2012/0195711 A1* | 8/2012 | Chiu | F16B 5/0208 411/103 |
| 2012/0224935 A1* | 9/2012 | Chiu | F16B 5/0266 411/352 |
| 2012/0237315 A1* | 9/2012 | Chiu | F16B 5/0208 411/171 |
| 2012/0237316 A1* | 9/2012 | Chiu | F16B 5/0208 411/353 |
| 2012/0251265 A1* | 10/2012 | Chiu | F16B 5/0208 411/349 |
| 2013/0170895 A1* | 7/2013 | Tseng | F16B 35/06 403/270 |
| 2013/0294863 A1* | 11/2013 | Tseng | F16B 5/0208 411/175 |
| 2014/0068921 A1* | 3/2014 | Tseng | F16B 5/0208 29/525.02 |
| 2014/0105707 A1* | 4/2014 | Tseng | F16B 21/04 411/508 |
| 2016/0003271 A1* | 1/2016 | Wang | F16B 5/00 403/322.4 |
| 2017/0009793 A1* | 1/2017 | Mahoney | B21J 15/36 |
| 2017/0073904 A1* | 3/2017 | McDowell | E01C 11/02 |
| 2017/0074303 A1* | 3/2017 | Bowers | F16B 5/0642 |
| 2017/0074304 A1* | 3/2017 | Bowers | F16B 5/0642 |
| 2017/0240121 A1* | 8/2017 | Yon | B60R 13/0206 |

\* cited by examiner

FIXING DEVICE

BACKGROUND OF THE INVENTION

1. Field of the Invention

The present disclosure relates to a fixing device, more particularly to a fixing device having a fixing assembly in which two sides of a cut groove of a second plate slide along a guiding incline of a stop part, and a rod is inserted through the cut groove into a fastening hole, a resilient component is moved back to its former position to rotate an outer casting tube, so that the stop part can be positioned in the fastening hole; next, a user can rotate the outer casting tube and then push the outer casting tube or the head part to separate the fixing assembly from the second plate. Therefore, the effect of reliably positioning and conveniently separating can be achieved.

2. Description of the Related Art

With continuous progress of electronic technology, many products use screws or bolts for positioning; for example, the products (such as drawer, keyboard stand, or machine plate assembly) with movable extendable structures, use screws or bolts to position sliding tracks or chute's after the sliding tracks or chutes are moved to particular locations, so that a user can perform wiring operation, move or transport equipment under a condition that the sliding tracks and chutes are immovable. For example, the equipment may be telecommunication office racks, computer servers or working stages which each is assembled by a plurality of devices and mechanisms. In conventional way of using screws or bolts for positioning the sliding tracks or chutes, a plate and other plate are stacked and slid relative to each other to be positioned, so as to facilitate the staff member's operation.

Furthermore, a general server chassis of a personal computer or industrial computer usually includes electronic devices such as a motherboard, a power supplier, a hard disk and a fan. However, the motherboard manufactures usually develop different motherboard specifications, it leads that a bottom board of the chassis must be provide with many copper pillars, and after the motherboard is flatly placed on the plurality of copper pillars, screws are respectively inserted into through holes of the motherboard to be locked in the copper pillars, so as to fix the motherboard with the bottom board integrally. However, with growth of shipments of the chassis of different manufactures, more copper pillars are required to dispose on the bottom board, and the conventional way of locking screws into the copper pillars to fix the motherboard with the bottom board is limited by space inside the chassis, and the user has to spend much time and labor in operation. Furthermore, the conventional way is also disadvantageous in quick assembly, which results in complicated assembly process, more working hour, and inconvenient operation. Therefore, what is need is to develop a novel fixing device to solve the above-mentioned problems.

SUMMARY OF THE INVENTION

In order to solve above-mentioned problems, the inventor collects data to design the fixing device according to years of experience, multiple tests and modifications A primary objective of the present disclosure is that a supporting surface of two sides of a cut groove of a second plate is contacted with and moved along a guiding incline of a stop part of a fastener, a rod of a fastener is extended out of a through hole of a sleeve, and a bottom surface of a head part is pressed against the resilient component to be resiliently deformed, and the resilient component will be resiliently moved back to its former position after the rod is passed through the cut groove and inserted into the fastening hole, and the outer casting tube, the head part and the fastener are driven to move back to its former position, and the guiding incline of the stop part is abutted with the tapered incline of the fastening hole, so as to be blocked by the fastening hole; as a result, the outer casting tube can be rotated to block the arc surfaces of the rod by the side wall of the fastening hole adjacent to the cut groove, so that the fixing assembly is positioned in the second plate. When the second plate is to be separated from the first plate, the user can just rotate the outer casting tube and press the surface of the outer casting tube or the head part, so as to extend the rod out of the through hole of the sleeve, release the guiding incline from the tapered incline of the fastening hole; as a result, the user can force to separate the second plate. The fixing assembly has a simple structure, so the fixing assembly can just be aligned with the second plate and the outer casting tube is then rotated to be reliably positioned; furthermore, the user can separate the second plate from the fixing device by using finger to rotate and push the fixing assembly. Therefore, the effects of reliably positioning and conveniently separating can be achieved.

A secondary objective of the present disclosure is that an interval of the narrow portion of the cut groove is equal to or greater than the interval of two longitudinal sections of rod, and smaller than the interval of two arc surfaces, so the user can rotate the outer casting tube to block the arc surface by the side wall of the fastening hole adjacent to the cut groove, so as to prevent the user from pressing the surface of the outer casting tube or the head part accidentally. After the stop part of the fastener is released from constrain of the fastening hole, the second plate can be pushed to move away from the fixing assembly in a direction reverse to the insertion direction. Therefore, the second plate can be reliably positioned with the fixing assembly.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
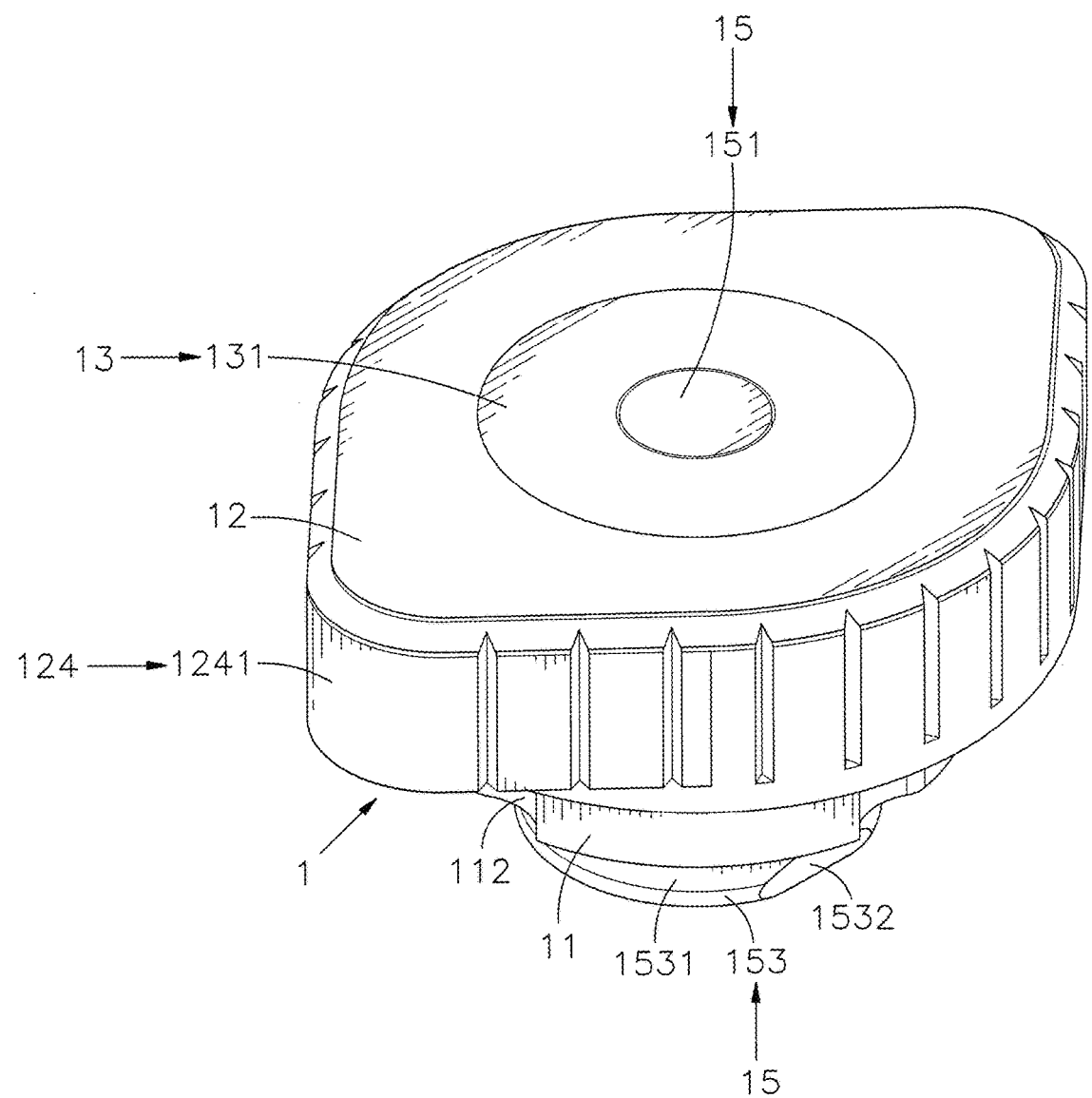
FIG. 1 is an elevational view of a fixing assembly of a preferred embodiment of the present disclosure.
Figure 2:
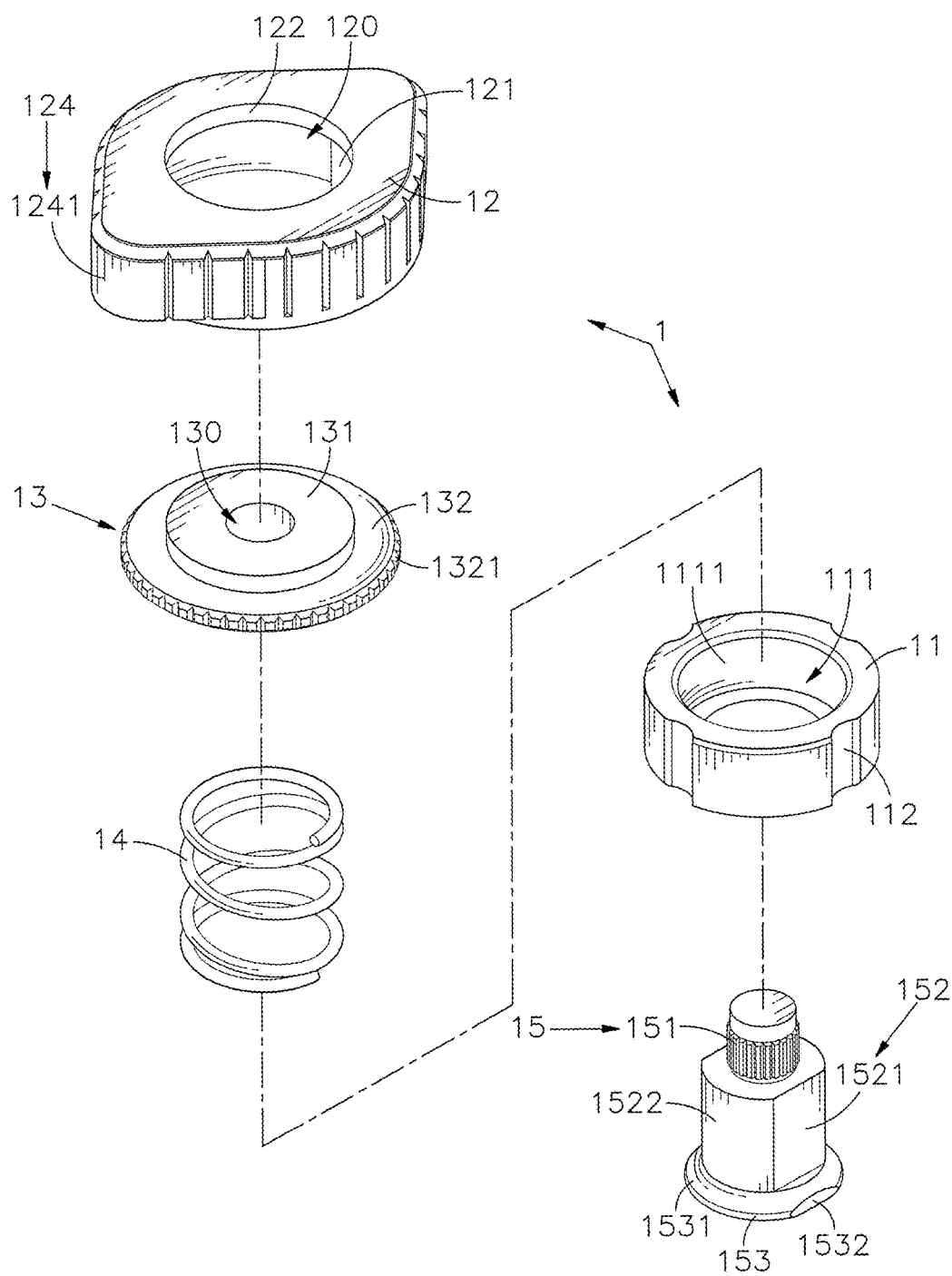
FIG. 2 is a perspective exploded view of the fixing assembly of the preferred embodiment of the present disclosure.
Figure 3:
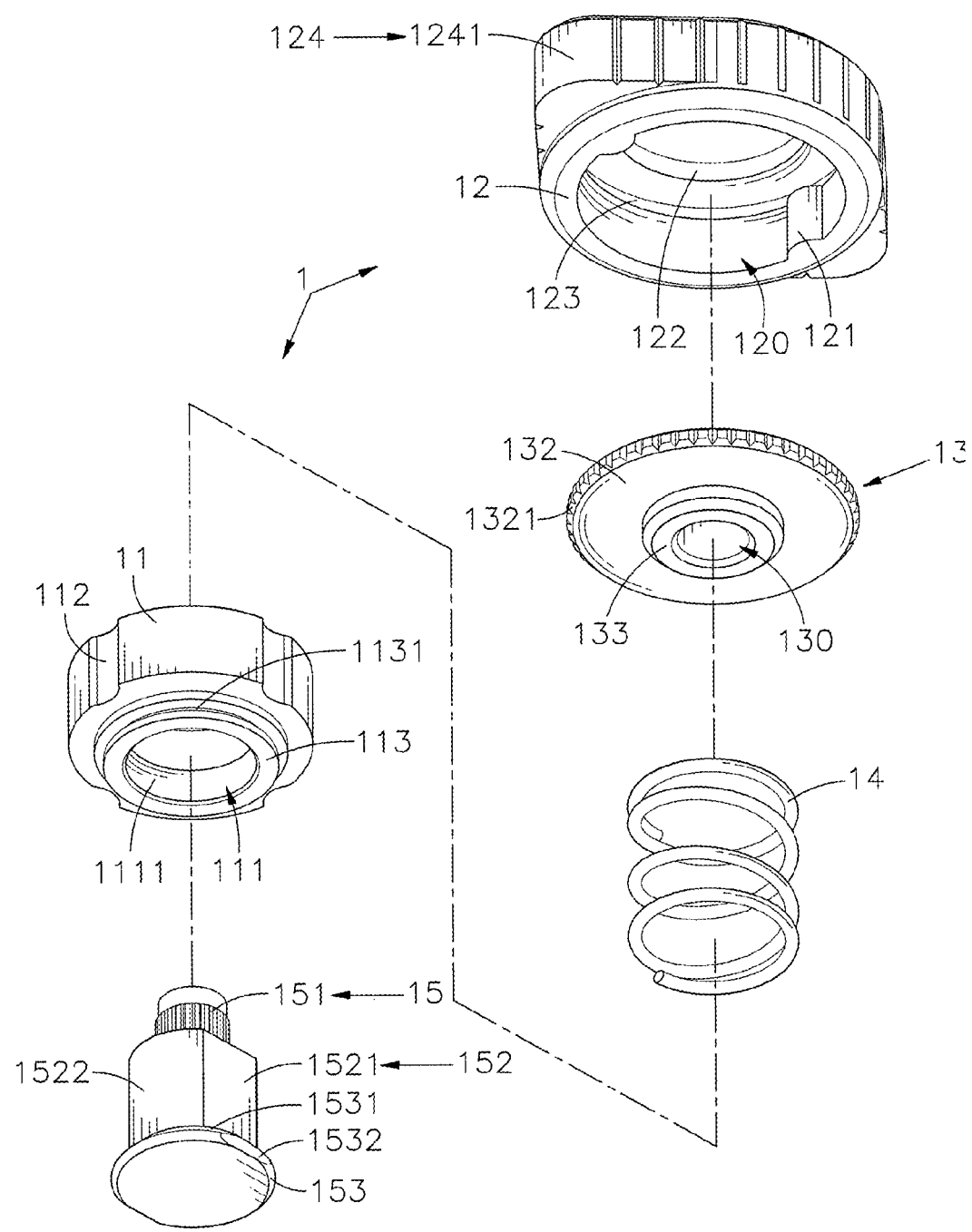
FIG. 3 is another perspective exploded view of the fixing assembly of the preferred embodiment of the present disclosure.
Figure 4:
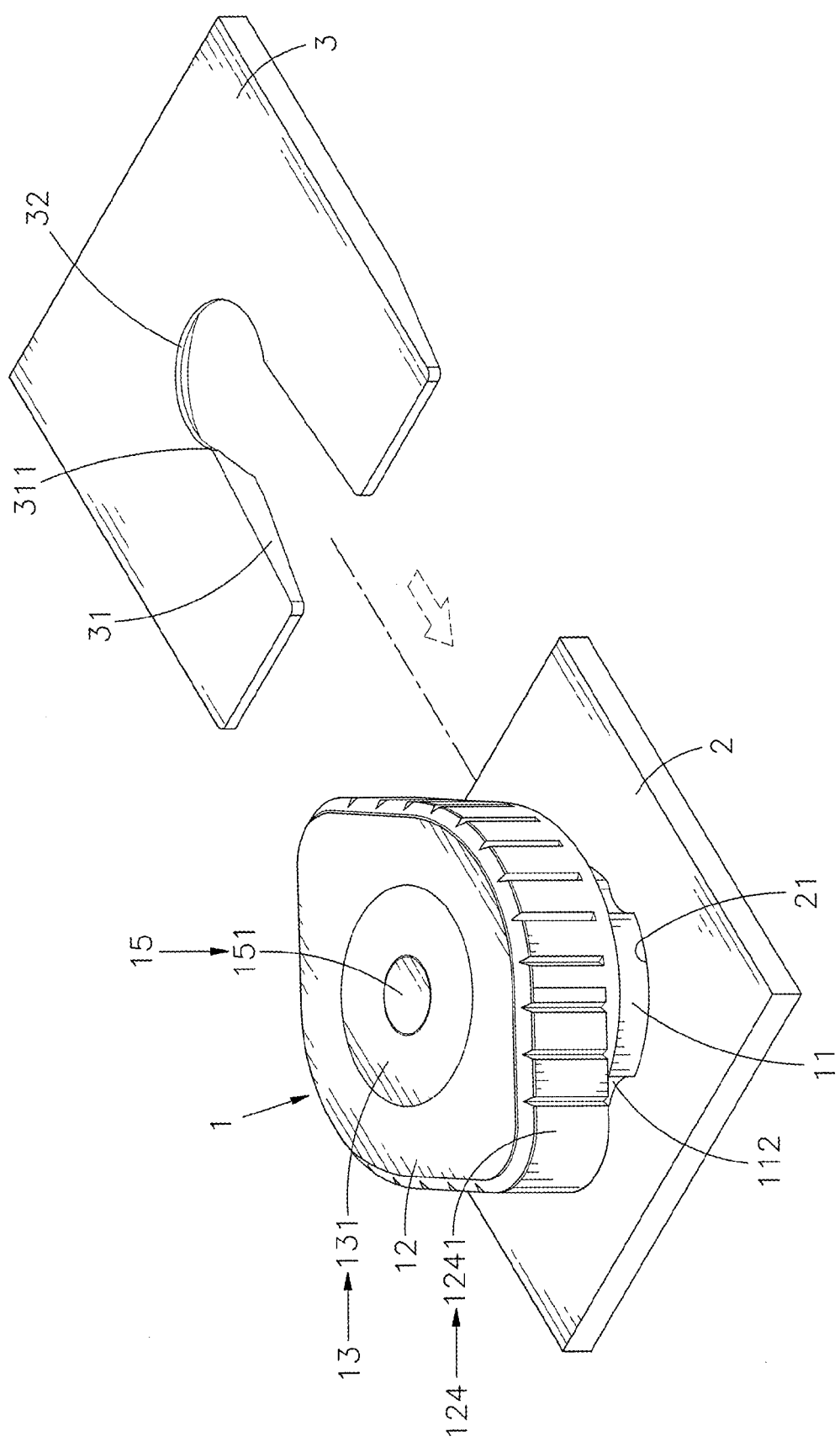
FIG. 4 is an elevational view of the preferred embodiment of the present disclosure, before assembly.
Figure 5:
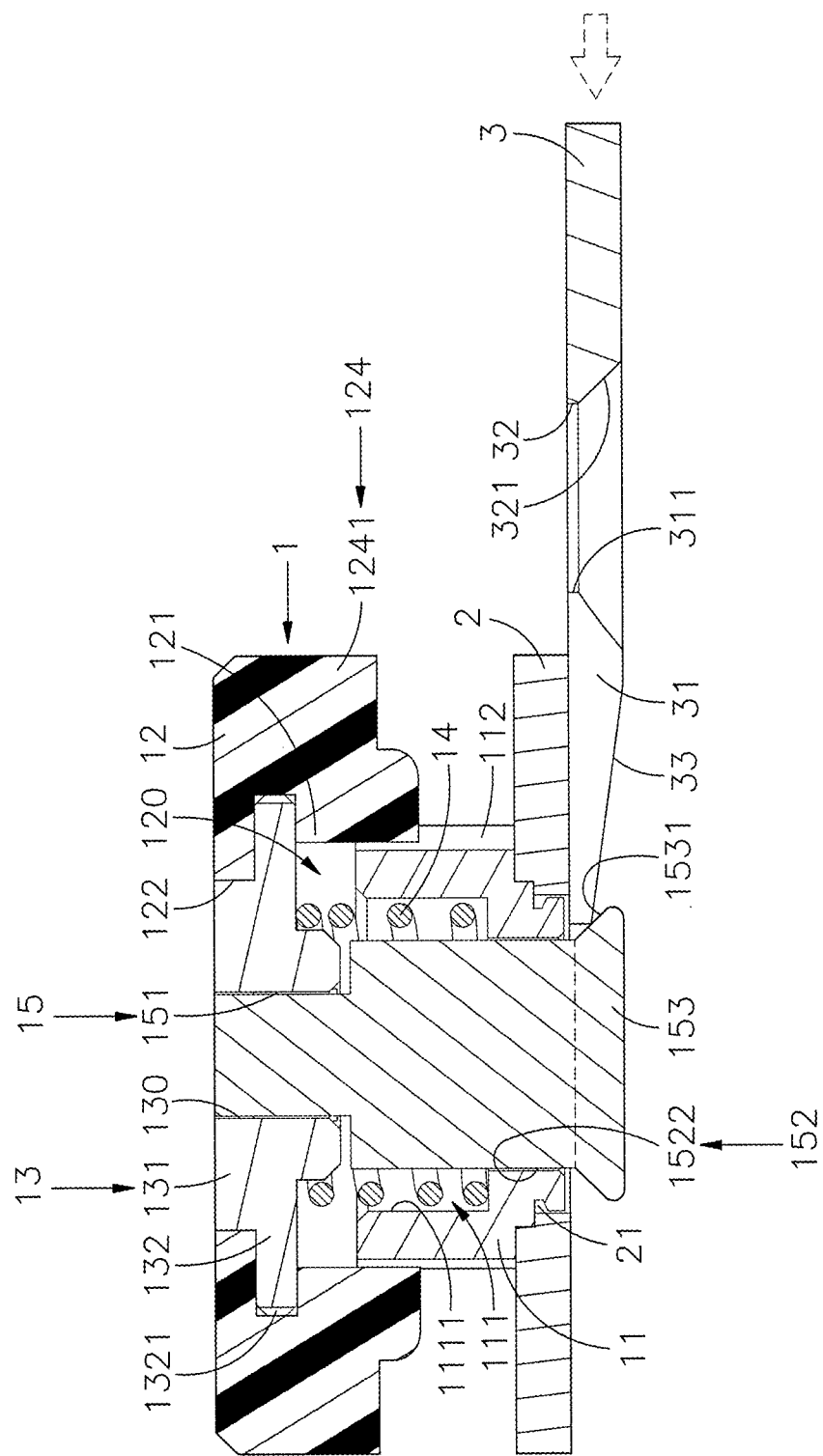
FIG. 5 is a sectional side view of a second plate of the preferred embodiment, before assembly.
Figure 6:
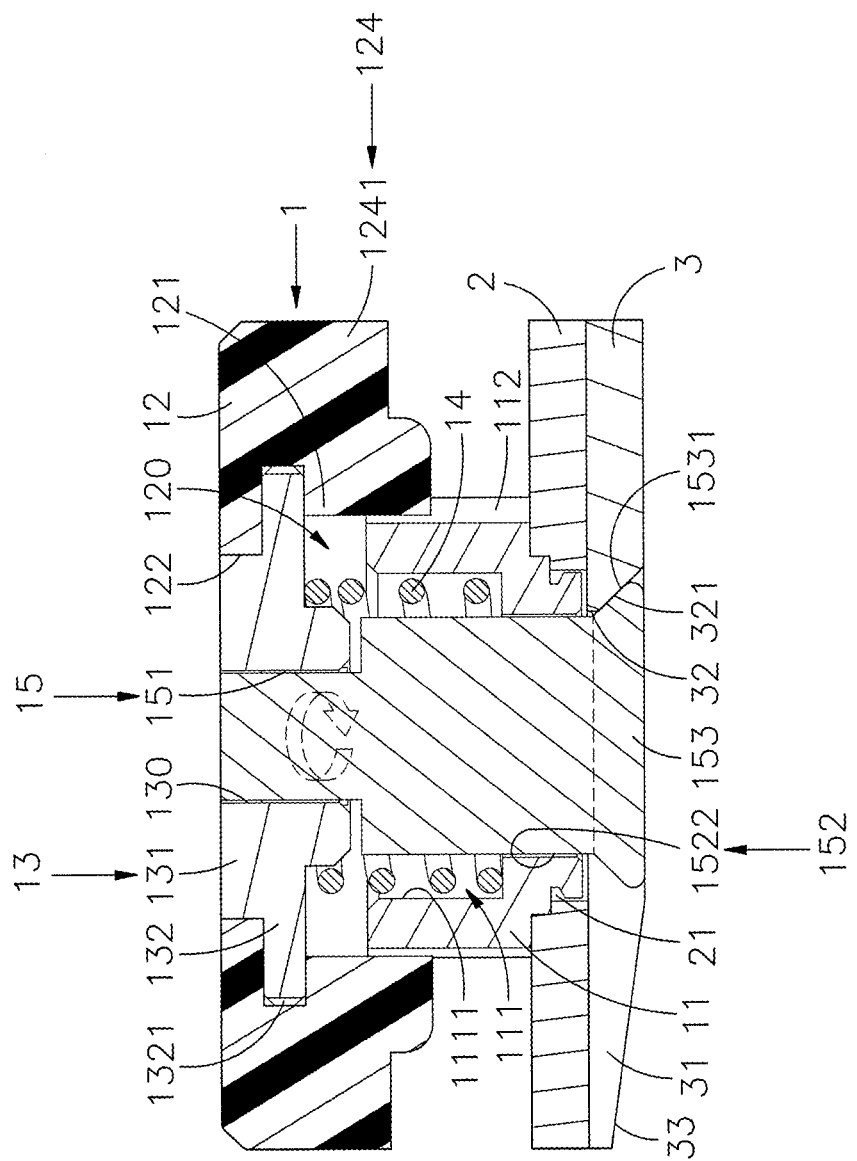
FIG. 6 is a sectional side view of the second plate of the preferred embodiment of the present disclosure, after assembly.
Figure 7:
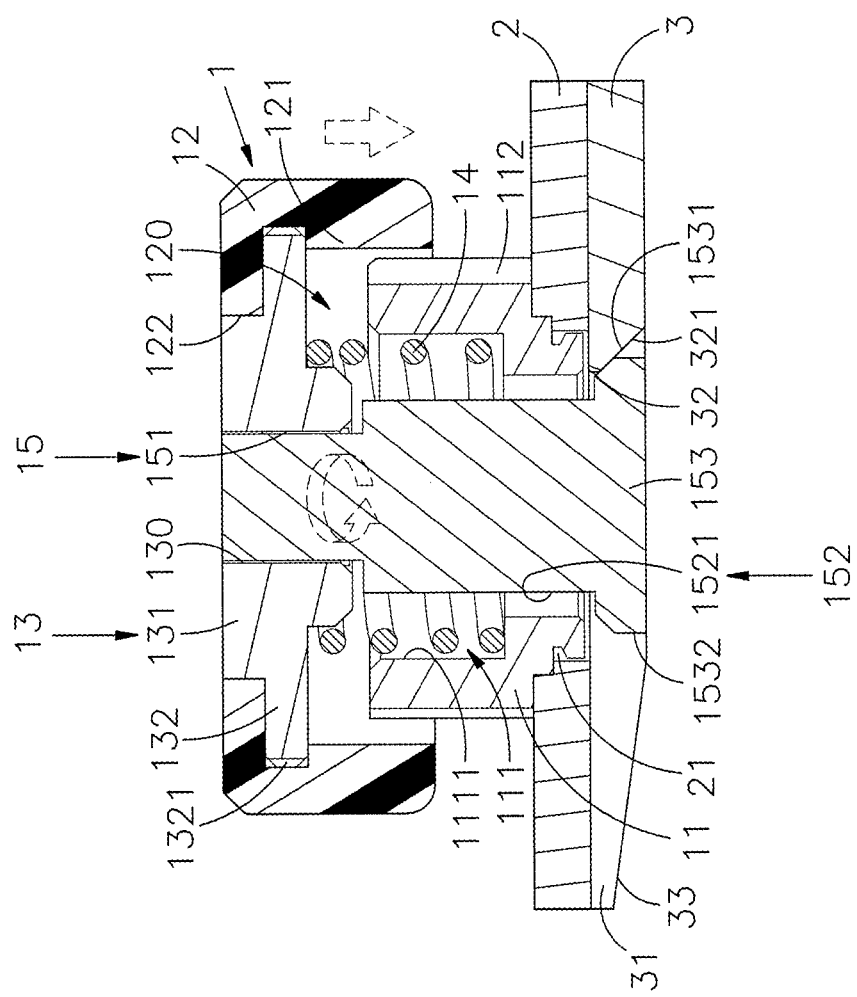
FIG. 7 is a sectional side view of the second plate of the preferred embodiment of the present disclosure, illustrating that the second plate is rotated to lock with the fixing device.
Figure 8:
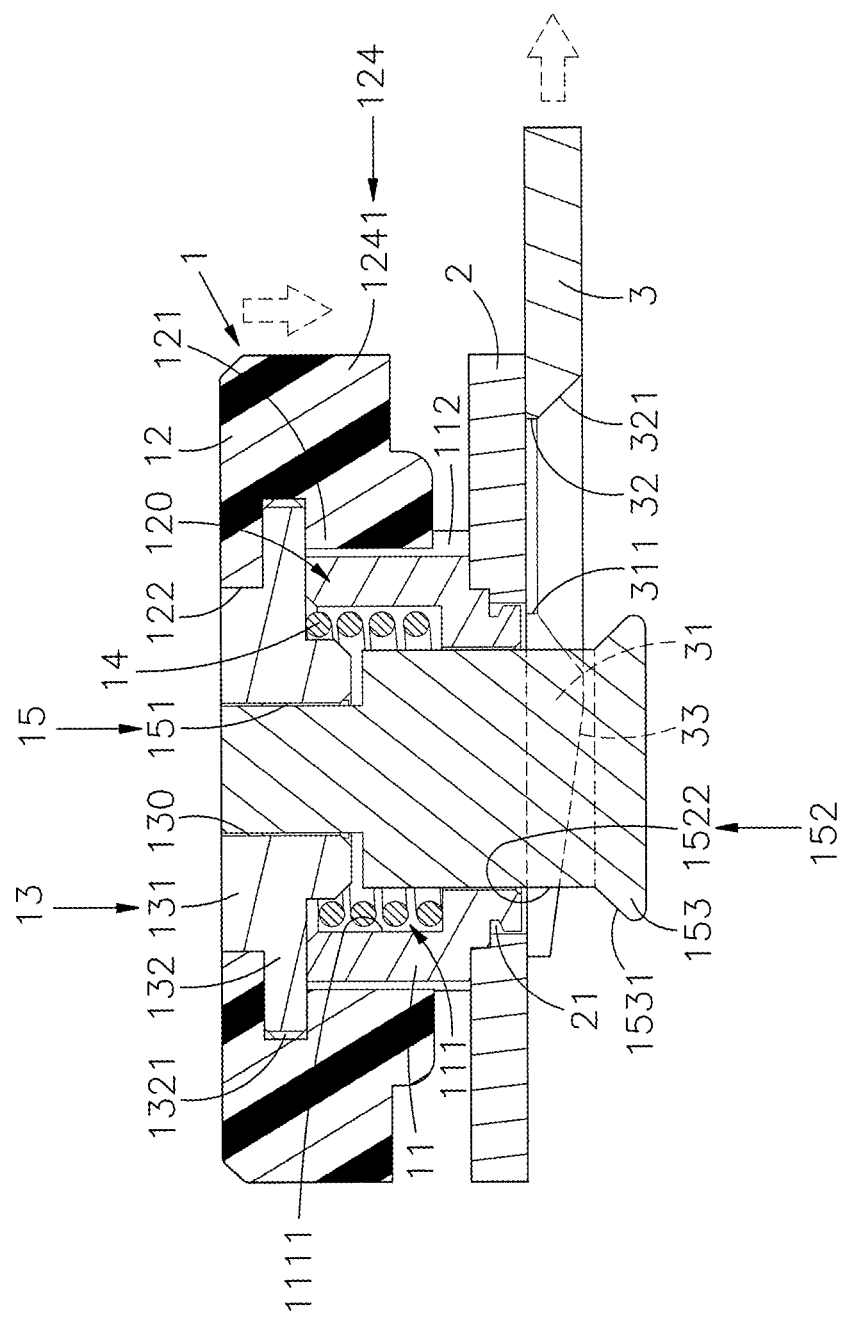
FIG. 8 is a sectional side view of the second plate of the preferred embodiment of the present disclosure, illustrating that the second plate is rotated to separate from the fixing device.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIGS. 1 through 4 which respectively show an elevational view, perspective exploded view, other perspective exploded view, an elevational view before assembly, of a fixing assembly of a preferred embodiment of the present disclosure. The fixing device includes a fixing assembly 1, a first plate 2 and a second plate 3.

The fixing assembly 1 includes a sleeve 11, an outer casting tube 12, a head part 13, a resilient component 14 and a fastener 15. The sleeve 11 has through hole 111 formed inside and cut therethrough, and the through hole 111 has a receiving groove 1111 formed at a top thereof and having an extended hole diameter. The sleeve 11 has a plurality of grooves 112 formed on an outer surface thereof and annularly arranged with equal interval, and a positioning part 113 formed at a bottom thereof, and the positioning part 113 has an annular trench 1131 formed on an outer surface thereof. The outer casting tube 12 is mounted on the top of the sleeve 11, and the outer casting tube 12 has receiving space 120 inside for receiving the sleeve 11. The receiving space 120 is formed with longitudinal protrusion ribs 121 disposed on an inside wall thereof and configured to be slidable in the plurality of grooves 112, and a mounting hole 122 formed at an upper portion thereof and having a tapered hole diameter. The receiving space 120 is further formed with an annular mounting groove 123 recessed on the inside wall adjacent to the mounting hole 122. The outer casting tube 12 has pulling members 124 formed on an outer surface thereof and extended outwardly. The head part 13 is placed inside the receiving space 120 of the outer casting tube 12, and has a base portion 131 mounted with the mounting hole 122, and a mounting hole 130 cut through a central part of the base portion 131. The base portion 131 has a locking protrusion ring 132 formed at a peripheral edge thereof, facing outwardly and configured to be mounted in the mounting groove 123. The locking protrusion ring 132 further has an engaging surface 1321 formed with tooth-shaped structures. The base portion 131 has a protrusion 133 formed at a bottom thereof and located at peripheral edge of the mounting hole 130. The resilient component 14 is abutted between the protrusion 133 of the head part 13 and the receiving groove 1111 of the sleeve 11. The fastener 15 is disposed under the sleeve 11 and configured to be inserted through the through hole 111 to be fixed with the head part 13. The fastener 15 has a riveting part 151 with an embossed pattern and configured to be mounted in the mounting hole 130, and a rod 152 extended from the bottom of the riveting part 151 and inserted into the through hole 111 of the sleeve 11. The rod 152 has longitudinal sections 1521 formed at two opposite sides of an outer surface thereof and cut therethrough, and the fastener 15 further has arc surfaces 1522 formed at other two opposite sides of the outer surface thereof corresponding to the longitudinal sections 1521. The rod 152 has a stop part 153 outwardly protruded at a bottom of the rod 152, and the stop part 153 has a guiding incline 1531 formed at a top thereof, and at least one section 1532 disposed on an outer surface thereof and parallel or perpendicular to the longitudinal sections 1521.

The first plate 2 has a hole 21, and the positioning part 113 of the sleeve 11 can be fixed in the hole 21.

The second plate 3 is placed in parallel to the first plate 2 during assembly, and the second plate 3 has a cut groove 31 cut through a side thereof and gradually tapered from outside to inside and configured for insertion of the rod 152 of the fastener 15. The cut groove 31 further has a narrow portion 311 formed at an end and gradually tapered, and a fastening hole 32 extended from the narrow portion 311 and having an outer diameter equal to or greater than that of the rod 152. The fastening hole 32 is formed with a gradually-extended incline 321 disposed at a side wall thereof remote from the first plate 2 and gradually extended outwardly. The gradually-extended incline 321 has an inclination equal to that of the guiding incline 1531 and is configured for return of the stop part 153. The second plate 3 has a supporting surface 33 disposed at ends of two side surfaces of the cut groove 31, gradually tapered outwardly and configured to push the guiding incline 1531 of the stop part 153, so that the rod 152 can be extended out of the outer side of the through hole 111 of the sleeve 11.

Preferably, the head part 13 of the fixing assembly 1 can be formed with the outer casting tube 12 integrally by overmolding manner with plastic material; however, in actual application, the locking protrusion ring 132 of the head part 13 and the outer casting tube 12 can be engaged together to form a single piece by an assembly manner. Various equivalent changes, alternations or modifications based on the above-mentioned content to achieve the same effect, are all consequently viewed as being embraced by the scope of the present disclosure.

Preferably, a contained angle between the guiding incline 1531 of the stop part 153 and the bottom surface of the stop part 153 is ranged between 60 degrees and 120 degrees, so as to facilitate to push the second plate 3 for positioning. The interval of the narrow portion 311 of the cut groove 31 of the second plate 3 is equal to or greater than the interval between two longitudinal sections 1521 of the rod 152, and smaller than the interval between the two arc surfaces 1522.

While the fixing assembly 1 is to be assembled with the first plate 2, the bottom surface of the positioning part 113 of the sleeve 11 of the fixing assembly 1 is pressed against the peripheral edge of the hole 21 of the first plate 2 first, and a stamping fixture is used to stamp the head part 13 of the fixing assembly 1, so as to force the resilient component 14 to be a resiliently deformable status. As a result, the bottom surface of the head part 13 can be pressed against the top of the sleeve 11 to simultaneously rivet the positioning part 113 of the sleeve 11 into the hole 21 for positioning. The sleeve 11 is stably locked tightly in the hole 21 by the annular trench 1131 of the positioning part 113, so as to combine the positioning part 113 and the sleeve 11 integrally to accomplish the assembly of the fixing assembly 1 and the first plate 2.

Preferably, the positioning part 113 of the sleeve 11 is mounted with the first plate 2 by a rivet manner; however, in actual application, the sleeve 11 can be mounted with the first plate 2 by a manner of SMT, welding, mortis or the like. Various equivalent changes, alternations or modifications based on the above-mentioned content to achieve the same effect, are all consequently viewed as being embraced by the scope of the present disclosure.

Please refer to FIGS. 5 through 8 which respectively show a sectional side view of the second plate before assembly, a sectional side view of the second plate after assembly, a sectional side view of the second plate being rotated to be locked with the fixing device, and a sectional side view of the second plate being rotated to be separated from the fixing device. As shown in FIGS. 5 through 8, while in use, the second plate 3 is placed in parallel to the first plate 2, and the sidewalls of two inner sides of the cut groove 31 of the second plate 3 are aligned with the two longitudinal sections 1521 of the rod 152 first, and the second plate 3 is then inserted with the rod 152. During process of the insertion, the supporting surface 33 of the second plate 3 is contacted with and pushed against the guiding incline 1531 of the stop part 153, and the end of the supporting surface 33 is inserted into the interval between the guiding incline 1531 and the sleeve 11 because the supporting surface 33 is outwardly tapered gradually. When the supporting surface 33 is contacted with the guiding incline 1531 and the second plate 3 is pushed to move continuously, the supporting surface 33 pushes the fastener 15 to move away from the sleeve 11, so that the rod 152 of the fastener 15 is moved towards the outer direction of the through hole 111 of the sleeve 11, and the outer casting tube 12 and the head part 13 are driven to move simultaneously. As a result, the resilient component 14 is pressed by the bottom surface of the head part 13 to be resiliently deformed until the guiding incline 1531 of the stop part 153 are abutted with the two opposite sidewalls of the cut groove 31 of the second plate 3, and at the same time, the rod 152 is inserted into the cut groove 31. While the second plate 3 is moved continuously, the rod 152 is inserted into the fastening hole 32 through the narrow portion 311. The gradually-extended incline 321 of a side wall of the fastening hole 32 remote from the first plate 2 is gradually extended outwardly, so when the guiding incline 1531 of the stop part 153 is moved into the fastening hole 32, the stop part 153 is released from the abutting status to enable the resilient component 14 to resiliently move back to its former position, and the outer casting tube 12 and the head part 13 are pushed to move back to their former positions simultaneously and the fastener 15 is also moved towards the sleeve 11 back to its former position. As a result, the stop part 153 of the fastener 15 is positioned in the fastening hole 32, and the guiding incline 1531 of the stop part 153 is abutted against the gradually-extended incline 321 of the fastening hole 32 for positioning stably.

After the guiding incline 1531 of the stop part 153 is abutted against the gradually-extended incline 321 of the fastening hole 32, the pulling member 124 of the outer casting tube 12 can be wrenched to rotate, so as to move the protrusion rib 121 by 90 degrees to cross the groove 112 into the other groove 112 for being blocked and positioned. The fastener 15 is rotated simultaneously, the longitudinal section 1521 of the rod 152 is non-aligned with the sidewall of the inner side of the cut groove 31 of the second plate 3, so that the arc surface 1522 of the rod 152 is abutted with the side wall of the fastening hole 32 adjacent to the narrow portion 311 of the cut groove 31. After the second plate 3 is assembled with the first plate 2, the arc surface 1522 of the rod 152 is abutted against the side wall of the fastening hole 32 adjacent to the narrow portion 311 of the cut groove 31, and the guiding incline 1531 of the stop part 153 is abutted against the gradually-extended incline 321 of the fastening hole 32, so that while the second plate 3 is forced by an external force to move in the insertion direction, the external force fails to push the fastener 15 to move to extend the rod 152. Therefore, the second plate 3 fails to separate from the first plate 2, and the effect of reliably positioning can be achieved.

When the second plate 3 is to be separated from the first plate 2, the pulling member 124 of the outer casting tube 12 is wrenched to rotate in a forward or backward direction, the protrusion rib 121 is driven to cross the other groove 112 to slide into the other or original groove 112 by a forward or backward 90-degree rotation for being blocked and positioned; as a result, the longitudinal sections 1521 of the fastener 15 are aligned with the corresponding sidewall of the inner side of the cut groove 31 of the second plate 3. At this time, the user can press the surface of the outer casting tube 12 or the head part 13 to simultaneously force the fastener 15 to move downwardly, the rod 152 of the fastener 15 is moved out of the through hole 111 of the sleeve 11 and the stop part 153 of the fastener 15 is released from the constraint of the fastening hole 32; at the same time, the bottom surface of the head part 13 is pressed against the resilient component 14 to be resiliently deformed, the second plate 3 can be applied by a force to move in a direction opposite to the insertion direction, and the rod 152 is moved out of the second plate 3 through the cut groove 31. After the user's finger stops applying force, the resilient component 14 is resiliently moved back to its former position and simultaneously drive the outer casting tube 12, the head part 13 and the fastener 15 to move back to their former positions, so that the rod 152 is inserted into the through hole 111 of the sleeve 11 again and ready for next assembly with the second plate 3.

When the fixing assembly 1 is not in use, or is assembled with the second plate 3, the rod 152 of the fastener 15 is partially protruded out of the through hole 111 of the sleeve 11. The protruding height can be changed upon a height of the resilient component 14 or a thickness of the fastening hole 32 of the second plate 3, as long as the second plate 3 can push the rod 152 to move in the through hole 111 during assembly, and the rod 152 can be moved in the through hole 111 back to its former position while not being subjected to an applied force. Various equivalent changes, alternations or modifications based on the above-mentioned content to achieve the same effect, are all consequently viewed as being embraced by the scope of the present disclosure.

Figure 9:
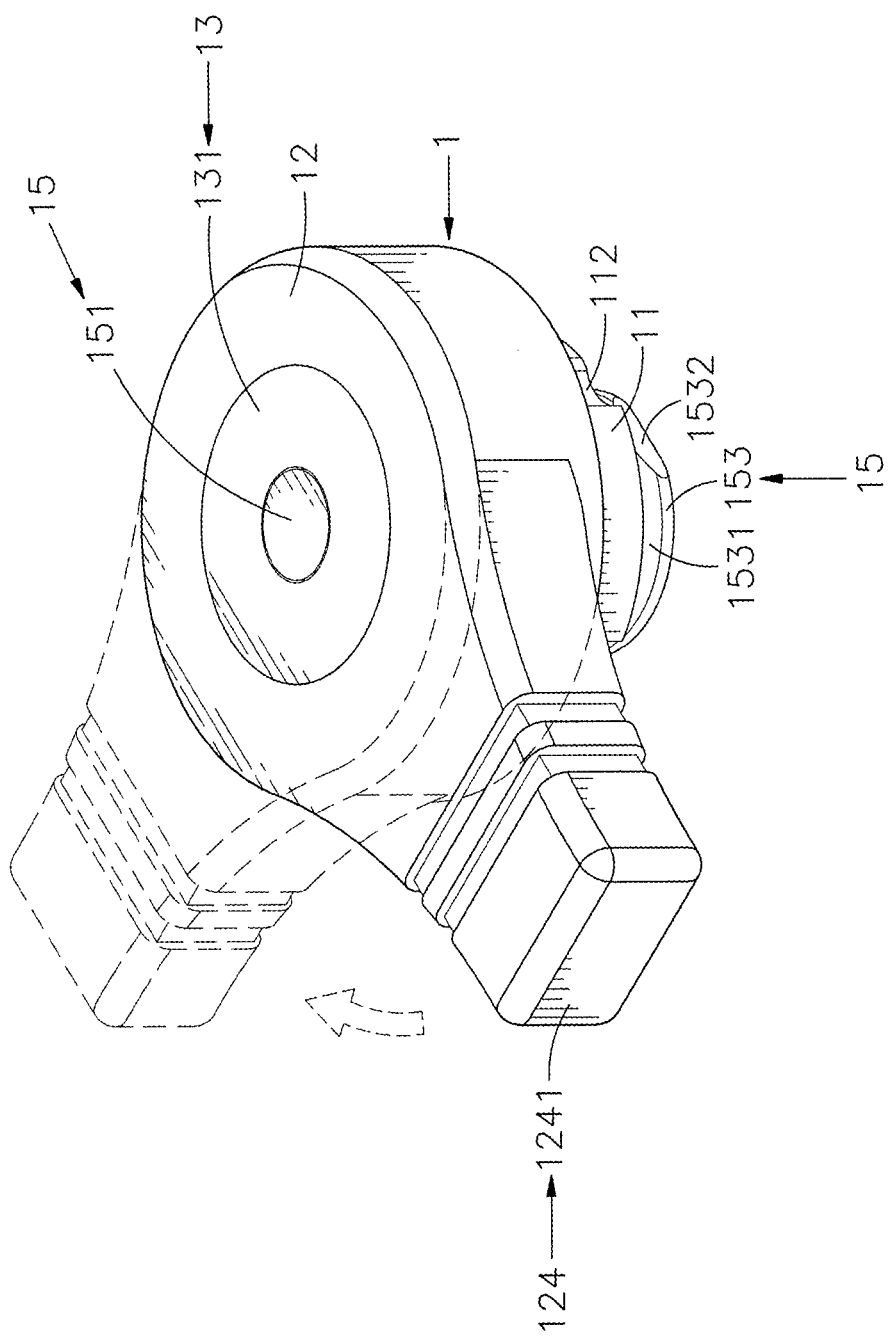
FIG. 9 is an elevational view of the fixing assembly of other embodiment of the present disclosure.
Figure 10:
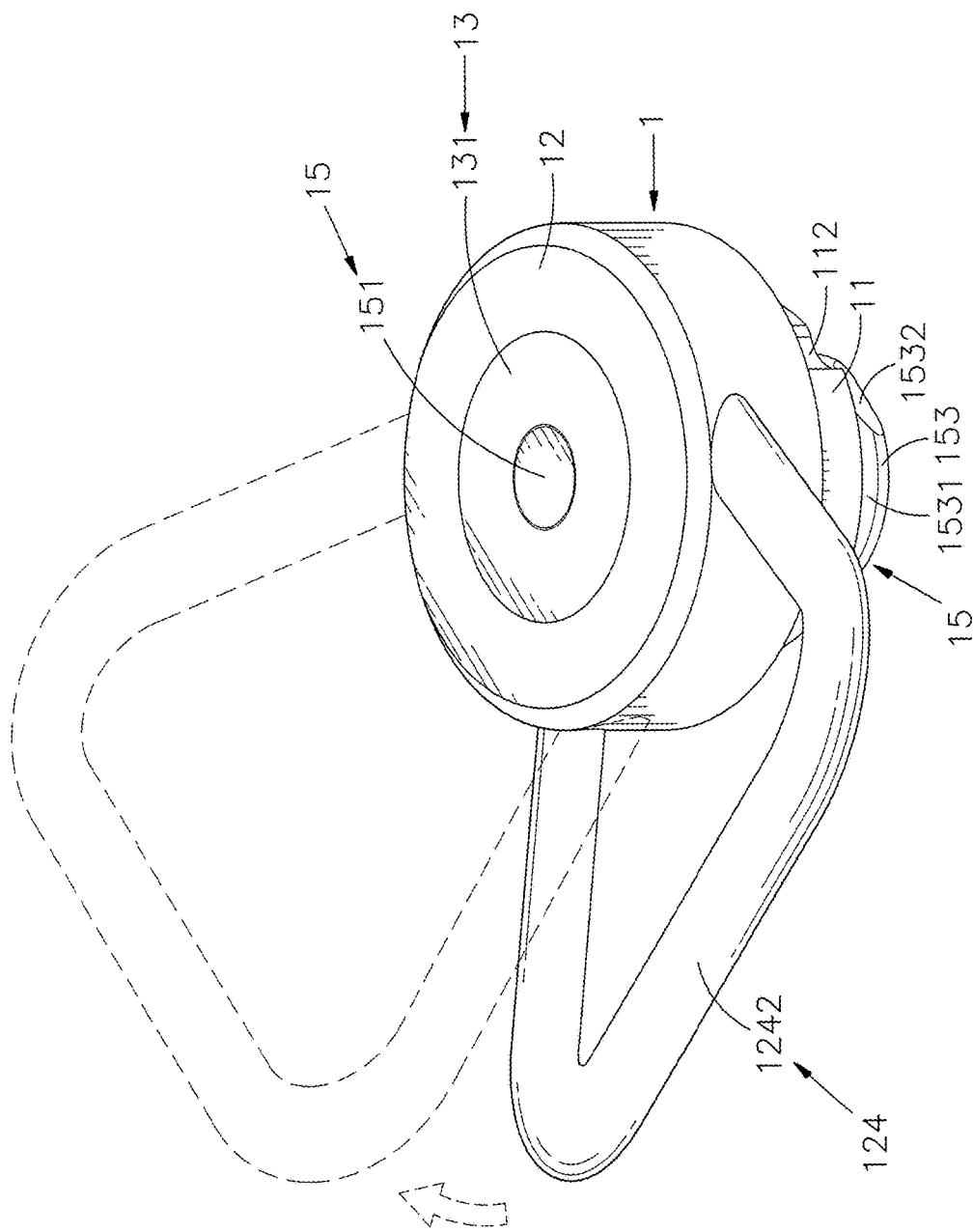
FIG. 10 is an elevational view of the fixing assembly of alternative embodiment of the present disclosure.

Please refer to FIGS. 1, 9 and 10 which respectively show the elevational view of the fixing assembly of the preferred embodiment, an elevational view of the fixing assembly of other embodiment and an elevational view of the fixing assembly of alternative embodiment, of the present disclosure. The pulling member 124 of the outer casting tube 12 can have a pulling member 1241 outwardly protruded at two opposite sides of the surface thereof, as shown in FIG. 1; or, the pulling member 124 of the outer casting tube 12 can have the pulling member 1241 outwardly protruded on a side of the surface thereof, as shown in FIG. 9; or the pulling member 124 of the outer casting tube 12 can have a pull-tab 1242 outwardly protruded on a side of the surface thereof, as shown in FIG. 10, as long as the user can pull a member (such as the pulling member 1241 or the pull-tab 1242) to rotate the outer casting tube 12. Various equivalent changes, alternations or modifications based on the above-mentioned content to achieve the same effect, are all consequently viewed as being embraced by the scope of the present disclosure.

The fixing assembly 1 of the present disclosure has a simple structure and provides a guiding function while being separated from the plate, and can be assembled with the second plate 3 by inserting the fixing assembly 1 with alignment and then rotating the outer casting tube 12 to form reliably positioning without using hand tools or user's hand to rotate the screw. When the fixing assembly 1 is to be separated from the second plate 3, the user can just rotate the outer casting tube 12 by finger, and then press the surface of the outer casting tube 12 or the head part 13 to separate the second plate 3 from the fixing assembly 1. Therefore, the fixing assembly 1 of the present disclosure can achieve effects of reliably positioning and conveniently separating.

Furthermore, in the present disclosure, the interval of the narrow portion 311 of the cut groove 31 is equal to or greater than the interval of the two longitudinal sections 1521 of the rod 152, and smaller than the interval of the two arc surfaces 1522. As a result, when the user rotates the outer casting tube 12, the arc surfaces 1522 are blocked by the side walls of the fastening hole 32 adjacent to the side wall of the cut groove 31, which can prevent from pressing the surface of the outer casting tube 12 or the head part 13 accidentally; and when the stop part 153 of the fastener 15 is released from the constraint of the fastening hole 32, the second plate 3 can be prevented from being moved in the direction reverse to the insertion direction, whereby the second plate 3 can be reliably positioned on the fixing assembly 1.

The above-mentioned embodiment is a preferred embodiment of the present disclosure, but the present disclosure is not limited thereto. In the fixing device of the present disclosure, the guiding incline 1531 of the stop part 153 located at the bottom side of the fastener 15 of the fixing assembly 1 is used to guide the supporting surfaces 33 of the two opposite sides of the second plate 3, to enable the rod 152 of the fastener 15 to insert into the fastening hole 32 through the cut groove 31, and after the resilient component 14 is moved back to its former position subject to its resilience, the outer casting tube 12 can be rotated to locate the stop part 153 in the fastening hole 32 for reliably positioning. Next, the user can rotate the outer casting tube 12 again and push the outer casting tube 12 or the head part 13, so as to separate the second plate 3 from the fixing assembly 1. Therefore, the fixing device of the present disclosure can achieve t effects of reliably positioning and conveniently separating. Various equivalent changes, alternations or modifications based on the above-mentioned content to achieve the same effect, are all consequently viewed as being embraced by the scope of the present disclosure.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A fixing device comprising a fixing assembly, a first plate and a second plate, wherein:

the fixing assembly comprises a sleeve, an outer casting tube, a head part, a resilient component and a fastener, said sleeve has a through hole inside and cut therethrough, and has a plurality of grooves recessed on an outer surface thereof and arranged with equal interval, and a positioning part disposed on a bottom side thereof, and wherein said outer casting tube is disposed at a top of said sleeve and has a receiving space inside for insertion of said sleeve, and said receiving space is formed with at least one longitudinal protrusion rib disposed on an inside wall thereof and slidable in the plurality of grooves, and wherein said head part is disposed inside the receiving space of said outer casting tube and has a mounting hole formed at a central part thereof and cut therethrough, and said resilient component is abutted between said head part and said sleeve, and said fastener is disposed under said sleeve, inserted into said through hole and fixed on said head part, and said fastener has a riveting part mounted in said mounting hole, and a rod extended from a bottom thereof and inserted through said through hole, and wherein said rod has longitudinal sections formed on two opposite sides of the outer surface thereof and cut therethrough, and said fastener has arc surfaces formed on other two opposite sides of the outer surface thereof, and said rod has a stop part outwardly protruded on a bottom side thereof, and said stop part has a guiding incline formed at a top thereof;

wherein said first plate has a hole for fixation of said positioning part of said sleeve; and wherein said second plate is placed in parallel to said first plate and has a cut groove cut through and having a tapered shape from outside of a side of said second plate for insertion of said fastener, and said cut groove has a narrow portion formed at an end thereof and configured to be blocked by said arc surfaces for rotation of said outer casting tube, and said narrow portion has a fastening hole extended from a side thereof and configured for insertion of said rod, and said fastening hole has a gradually-extended incline formed on a sidewall thereof remote from said first plate and configured for return of said stop part, and said second plate has a supporting surface formed on ends of two side surfaces of said cut groove and tapered outwardly, and configured to push said guiding incline of said stop part to extend said rod out of said through hole of said sleeve.

2. The fixing device according to claim 1, wherein said through hole of said sleeve has a receiving groove formed at the top thereof and having an extended hole diameter, and configured to abut with an end of said resilient component.

3. The fixing device according to claim 1, wherein said positioning part of said sleeve has an annular trench disposed on an outer surface thereof.

4. The fixing device according to claim 1, wherein the receiving space of said outer casting tube is formed with a mounting hole disposed on an upper part thereof and having a tapered hole diameter, and the receiving space is formed with an annular mounting groove recessed on an inside wall thereof adjacent to said mounting hole, and said outer casting tube has a pulling member outwardly formed on a surface thereof, and said head part has a base portion protruded on a top thereof and configured to be mounted in said mounting hole, said base portion has a locking protrusion ring form on a peripheral edge outwardly and configured to be mounted in said mounting groove, and said locking protrusion ring has an engaging surface formed with tooth-shaped structures, and said base portion has a protrusion formed at a bottom thereof and located at peripheral edge of said mounting hole, and configured to be mounted with said resilient component.

5. The fixing device according to claim 4, wherein said pulling member has at least one pulling member or pull-tab.

6. The fixing device according to claim 1, wherein said stop part of said fastener has at least one section formed on an outer surface thereof and being parallel or perpendicular to said longitudinal sections.

7. The fixing device according to claim 1, wherein a contained angle between said guiding incline of said stop part and the bottom surface of said stop part is ranged between 60 degrees and 120 degrees.

8. The fixing device according to claim 1, wherein an interval of said narrow portion of said cut groove of said second plate is equal to or greater than an interval of said two longitudinal sections of said rod, and smaller than an interval of said two arc surfaces.

9. The fixing device according to claim 1, wherein said fastening hole of said second plate has an outer diameter equal to or greater than an outer diameter of said rod, and said gradually-extended incline of said fastening hole has an inclination equal to that of said guiding incline of said stop part.

10. A fixing device, comprising a fixing assembly which comprises a sleeve, an outer casting tube, a head part, a resilient component and a fastener, wherein:

said sleeve has a through hole inside and cut therethrough, and a plurality of grooves recessed on an outer surface thereof and arranged with equal interval, and said sleeve has a positioning part disposed at a bottom side thereof;

wherein said outer casting tube is disposed over said sleeve, and has receiving space inside for insertion of said sleeve, and the receiving space is formed with at least one longitudinal protrusion rib disposed on an inside wall thereof and slidable in said plurality of grooves;

wherein said head part is disposed in the receiving space of said outer casting tube, and has a mounting hole formed at a central part thereof and cut therethrough;

wherein said resilient component is abutted between said head part and said sleeve;

wherein said fastener is disposed under said sleeve and inserted into said through hole, and fixed on said head part, and said fastener has a riveting part configured to be fixed in said mounting hole, and said riveting part has a rod extended from a bottom thereof and configured to be inserted into said through hole, and said rod has longitudinal sections formed on two opposite sides of an outer surface thereof and cut therethrough, and arc surfaces formed on two sides of the outer surface thereof other than said longitudinal sections, and said rod has a stop part outwardly protruded on a bottom side thereof, and said stop part has a guiding incline formed on a top thereof, and a second plate abut against the guiding incline, to drive the rod to move out of the through hole of the sleeve.

\* \* \* \* \*